Aug. 2, 1938.    G. K. McKEE ET AL    2,125,641
MACHINE TOOL
Filed April 29, 1935    2 Sheets-Sheet 1
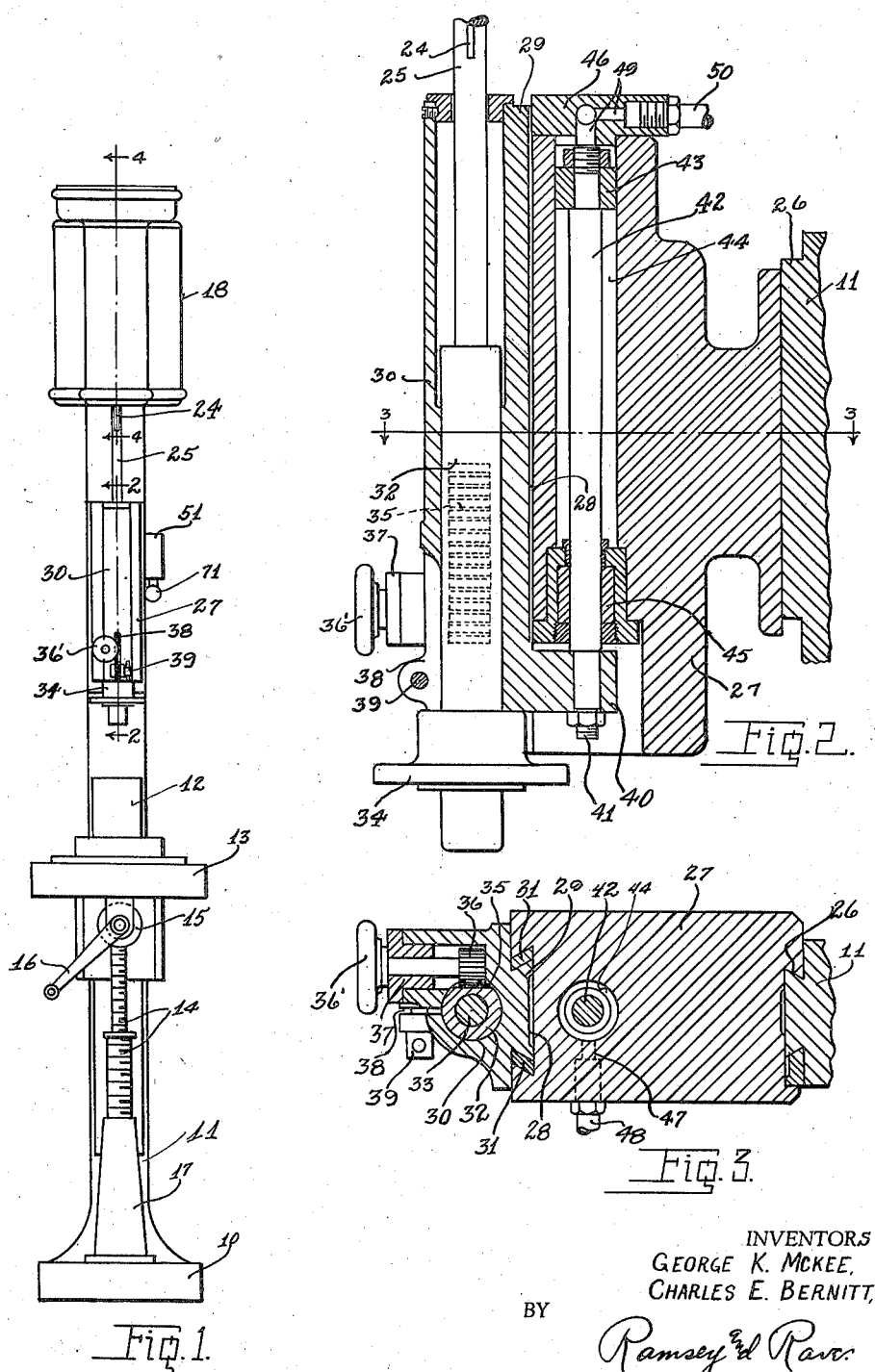
INVENTORS
GEORGE K. MCKEE,
CHARLES E. BERNITT,
BY
Ramsey & Ravc.
ATTORNEYS

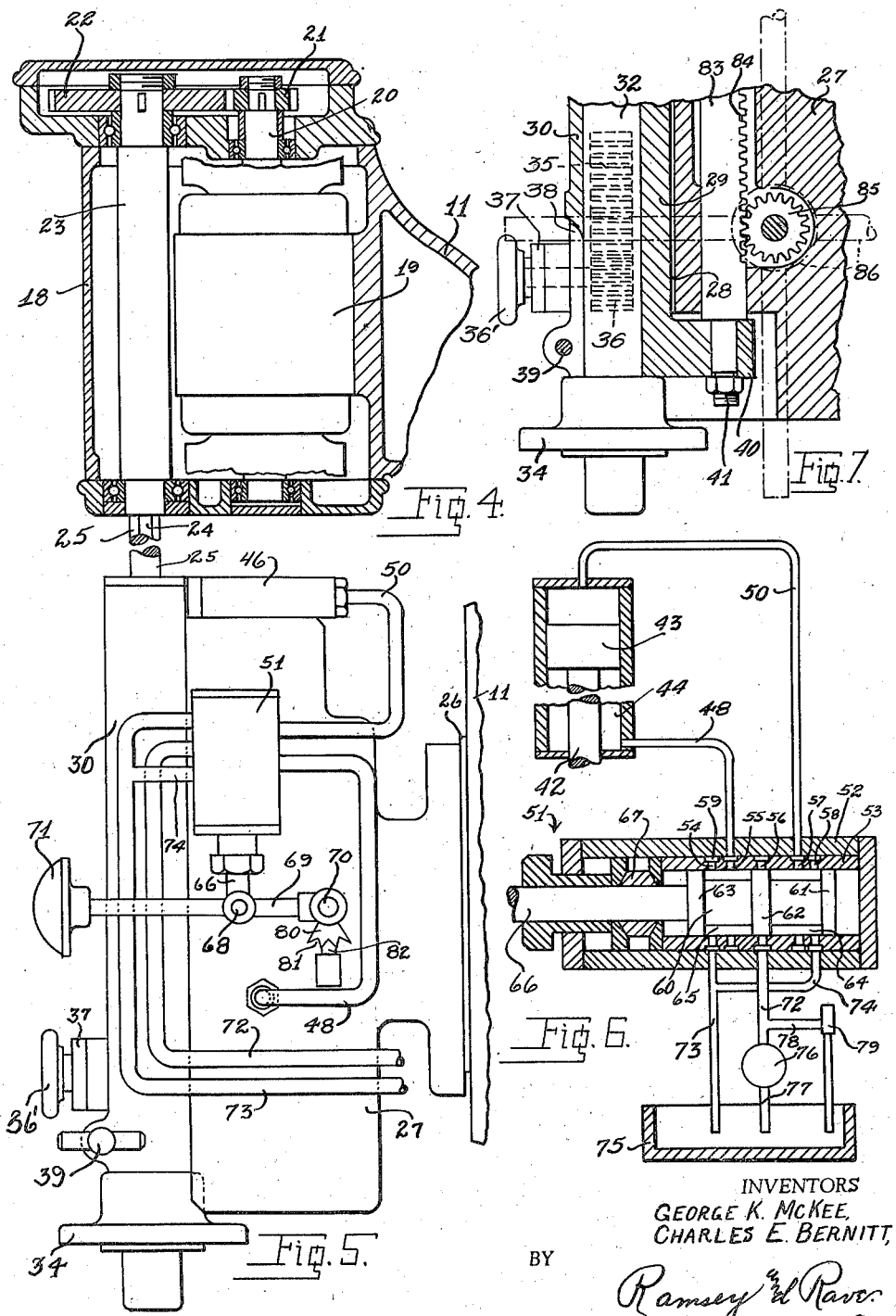

Patented Aug. 2, 1938

2,125,641

UNITED STATES PATENT OFFICE 2,125,641

MACHINE TOOL

George K. McKee and Charles E. Bernitt, Cincinnati, Ohio, assignors to The Avey Drilling Machine Company, Covington, Ky., a corporation of Ohio Application April 29, 1935, Serial No. 18,817

6 Claims. (Cl. 77—32)

This invention relates to improvements in machine tools and particularly to improvements in means for mounting a drill spindle as employed on high speed drilling machines.

An object of this invention is the provision of a spindle mounting whereby the spindle is actuated or fed along a definite unvarying path.

Another object of the invention is the provision of an improved drilling spindle support wherein the lateral thrust incident to the actuation of the spindle is not taken by the quill guide bearing, thereby eliminating wear on the said bearing which wear eventually caused said spindle to operate through a path not intended and thereby threw the holes bored by the machine out of alignment.

A further object of the invention is the provision of a drilling machine as above identified in which the spindle carrier has the actuating force applied thereto in such a manner as to prohibit any lateral or side thrust against the quill guide bearings and in which said spindle carrier has a full bearing throughout its range of feed with a negligible amount of overhang during operation.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a front elevational view of a high speed drilling machine embodying the improvements of this invention;

Fig. 2 is an enlarged vertical sectional view through the spindle carrier as seen from line 2—2 on Fig. 1;

Fig. 3 is a horizontal sectional view of Fig. 2 as seen from line 3—3 on said Fig. 2;

Fig. 4 is an enlarged vertical sectional view through one form of driving mechanism for the spindle and as seen from line 4—4 on Fig. 1;

Fig. 5 is a side elevational view of the spindle carrier;

Fig. 6 is a diagrammatic view illustrating an hydraulic circuit and control valve therefor for effecting and controlling the feed of the drilling spindle; and Fig. 7 is a sectional view of a portion of Fig. 2 illustrating a mechanism for manually actuating or feeding the spindle.

Throughout the several views of the drawings similar reference characters are employed to denote the same or similar parts.

In the past it has been customary to provide a drilling head with a relatively short bearing in which was disposed a quill having rotatably journaled therein the drill supporting spindle. This quill had secured to it a rack bar with which meshed a rack pinion which, upon rotation, actuated the quill relative to its bearing. The angular thrust of the rack pinion against the spindle quill caused the same to eventually wear the quill bearing thereby throwing the drill out of alignment with a consequent result of holes bored out of plumb with one another.

To overcome the disadvantages above enumerated the present invention contemplates a structure in which there is provided a carrier or sleeve having a bearing of angular cross-section along one face thereof engaging a correspondingly shaped bearing in the drill head or bracket and in which carrier or sleeve is disposed the drill spindle quill. In order to actuate the drill by the present invention a force, manual or power, is applied to the carrier in such a way as to prohibit any lateral or side thrust on the spindle and quill bearings thereby insuring the drill at all times moving through the predetermined path or having a straight line motion.

Specifically, the machine of the present invention, and as shown in the drawings, comprises a base 10 having rising therefrom a column 11 and provided on its forward face with a dovetailed guide 12. Mounted on the dovetailed guide 12 is the work supporting table 13 which is movable relative to the guide 12 by means of adjusting screws 14. The said adjusting screws 14 are actuated through bevel gears 15 and handle 16 relative to the upstanding sleeve nut 17.

The upper end of the column 11 terminates in a housing 18 which overlies the work supporting table 13. The housing 18 encloses a motor 19 having projecting from its upper end a motor shaft 20. Keyed or otherwise removably secured to the shaft 20 is a gear 21 meshing with a gear 22 likewise keyed or otherwise removably secured to one end of a driving sleeve 23. The driving sleeve 23 is rotatably mounted in suitable bearings provided by the housing 18 and has splined thereto for rotative movement therewith and independent axial movement relative thereto, as at 24, a drive shaft 25.

The foregoing specific construction of the drilling machine is well known and forms no part of the present invention except in combination with the mechanism now to be described.

The column 11 intermediate the work supporting table 13 and housing 18 is provided with a supporting face which may be plane or dovetailed as shown at 26 in Fig. 3. Secured to this supporting face is a bracket or head 27. The head 27 is provided in its forward face with a dovetailed guideway 28 receiving a correspondingly shaped tongue 29 projecting from the spindle carrier 30. As will be seen from Fig. 3 the tongue 29 is of less width than the groove 28 and the said tongue is flanked on each side by the usual adjustable gib 31 for properly positioning the carrier relative to the guideway 28. It should also be noted that the guideway 28 is of greater length than the tongue 29, projecting below said tongue as at 29' wherefore ample guiding surface is provided when the carrier is actuated to its lowest limit.

Disposed within a suitable bearing in the carrier or sleeve 30 is a quill 32 providing interiorly thereof bearings for the spindle 33. The spindle 33 has secured to one end thereof a drill chuck 34 or similar means for securing a drill thereto. The upper end of the spindle is connected with the drive shaft 25 so as to partake of any rotary motion imparted to the said shaft. The quill 32 is adapted to be axially adjusted relative to the spindle carrier or sleeve 30 but has no rotative movement therein. In order to adjust the position of the quill it is provided along one side thereof with rack teeth 35 meshing with a rack pinion 36 rotatably journaled in suitable bearings 37 provided by the carrier or sleeve 30. In order to rotate the pinion 36 its stem is provided with a manually operable knob 36'. In order to secure the quill in adjusted positions the said carrier or sleeve 30 is provided with a saw slot, as at 38, the opposite sides of which are forced toward one another by a clamping screw 39 to impinge upon the quill 32.

As seen in Fig. 2 the spindle carrier or sleeve 30 has projecting from one end thereof a tongue 40 to which is secured one end 41 of a piston rod 42. The piston rod 42 carries at its upper end a piston 43 which is disposed in a cylinder or bore 44 provided in the bracket or spindle head 27. The lower end of the cylinder 44 is closed by a suitable stuffing box construction 45 which prohibits the passage of any fluid from the cylinder while the upper end thereof is closed by a cylinder head 46 through which are formed suitable ducts or ports 49 for the introduction of an hydraulic medium under pressure into the cylinder 44. In order to supply the hydraulic medium to the other end of the cylinder the head 27 is provided with a suitable port 47 to which is connected one end of a pipe or conduit 48 while the ports 49 in the cylinder head 46 have connected therewith one end of a pipe or conduit 50.

By reference to Fig. 3 it will be noted that the axis of the quill 32 is on one side of the spindle carrier or sleeve bearing and guideway 28—29 while the axis of the piston rod or point of force application is on the other side thereof.

As seen in Fig. 5 the other ends of the pipes or conduits 48 and 50 terminate in a valve mechanism indicated in general by the reference character 51. This valve mechanism 51 is shown somewhat in detail in Fig. 6 and comprises a valve housing 52 into which is pressed a valve sleeve or bushing 53. The sleeve or bushing 53 is provided with a plurality of sets of radial ports 54, 55, 56, 57 and 58 each set being encircled by a similar circumferential groove 59 formed in the exterior of the sleeve or bushing 53. Disposed within the bore in the sleeve or bushing 53 is a valve member 60 having formed thereon piston portions 61, 62 and 63 forming between them reduced portions or cannelures 64 and 65 adapted to connect the radial ports in different combinations depending upon the position of the valve 60.

In order to adjust the position of the valve 60 it has projecting from one end thereof a stem 66 which passes through a stuffing box 67 provided at one end of the casing 52. The free end of the valve stem 66 is connected at 68 with a lever 69 in turn pivoted at 70 to the side of the bracket or drill head 27. The free end of the lever 69 is provided with a suitable handle or knob 71.

By reference to Fig. 6 it will be noted that the pipes or conduits 48 and 50 respectively connect with the bushing ports 55 and 57 while the ports 56 have connected therewith one end of a pipe or conduit 72. The remaining bushing ports 54 and 58 have respectively connected therewith discharge conduits 73 and 74 which terminate at their other ends in a sump or tank 75 which may be a tank separate and apart from the machine or incorporated therein as in the supporting base 10. The pressure pipe or conduit 72 has its other end connected with a pump 76 from which extends a suction pipe 77 terminating in the tank 75. The pressure pipe or conduit 72 has connected therewith a pipe or conduit 78 which is connected with a pressure relief valve 79 that determines the maximum operating pressure in the circuit or hydraulic system.

It is believed that the operation of the circuit is self-evident since a movement of the valve member 60 to the right connects, through its cannelure 65, the pressure pipe or conduit 72 with the pipe or conduit 48 and effects an upward movement of the piston 43 while at the same time through its cannelure 64 it connects the pipe or conduit 50 with the discharge pipe or conduit 74. A reverse movement of the piston 60 connects the pressure pipe or conduit 72 with the pipe or conduit 50 and the pipe or conduit 48 with the discharge 73.

In order to hold the valve member 60 in its several positions the lever 69 is provided with a plate 80 having formed therein notches 81 adapted to receive the spring pressed dog 82 as is usual practice.

From the foregoing it is believed now evident that there has been provided a mechanism which will give all of the advantages set out in the objects at the beginning of this specification.

In the modification shown in Fig. 7 provisions are made for accommodating a manually operated machine instead of a power feed machine. In the construction there shown the piston rod 42 is supplanted by a rack bar or rod 83 carrying along one side thereof rack teeth 84 meshing with a rack pinion 85 rotatably journaled in the bracket or head 27. The driving shaft for the pinion 85 would project beyond the bracket or drill head to receive a lever or the like 86 shown in the drawings in phantom lines as a pilot wheel.

What is claimed is:

1. In a machine tool organization, the combination of a column or bed, a prime mover at one end of said column or bed, a work support beneath said prime mover, a tool head carried by the column or bed at a point intermediate the prime mover and work support, said tool head having in one face thereof an angular guide-way, a spindle carrier adjacent to the tool head and having a guiding tongue projecting therefrom into the tool head guide-way, a spindle rotatably journaled in said spindle carrier and having its upper end connected with the prime mover, a lug projecting from the spindle carrier, means within the tool head behind the guide-way and connected with the spindle carrier lug for actuating the carrier through a path determined by the guiding tongue and guide-way toward the work supporting table, and means for effecting an axial adjustment of the spindle carrier and spindle relative to one another.

2. In a machine tool organization, the combination of a column or bed, a prime mover at one end of said column or bed, a work support beneath said prime mover, a tool head carried by the column or bed at a point intermediate the prime mover and work support, said tool head having in one face thereof an angular guide-way, a spindle carrier adjacent the tool head and having a guiding tongue projecting therefrom into the tool head guide-way, a spindle rotatably journaled in said spindle carrier and having its upper end connected with the prime mover, a lug projecting from the spindle carrier, means within the tool head behind the guide-way and connected with the spindle carrier lug for actuating the carrier through a path determined by the guiding tongue and guide-way toward the work supporting table, comprising a piston and piston rod connected with the spindle carrier lug and means for effecting an axial adjustment of the spindle and carrier relative to one another.

3. In a machine tool organization, the combination of a column or bed, a prime mover at one end of said column or bed, a work support beneath said prime mover, a tool head carried by the column or bed at a point intermediate the prime mover and work support, said tool head having in one face thereof an angular guide-way, a spindle carrier adjacent to the tool head and having a guiding tongue projecting therefrom into the tool head guide-way, a spindle rotatably journaled in said spindle carrier and having its upper end connected with the prime mover, a lug projecting from the spindle carrier, means within the tool head behind the guide-way and connected with the spindle carrier lug for actuating the carrier through a path determined by the guiding tongue and guide-way toward the work supporting table, comprising a piston and piston rod connected with the spindle carrier lug, hydraulic means including a source of pressure, a hydraulic circuit and a control valve in said circuit for reversely actuating the piston and tool carrier connected therewith and means for effecting an axial adjustment of the spindle carrier and spindle relative to one another.

4. In a machine tool organization, the combination of a column or bed, a prime mover at one end thereof, a work support carried by the column or bed at a point below the prime mover, a tool head secured to the column or bed at a point intermediate the prime mover and work support, said tool head having formed in one face thereof an angular shaped guide-way, a spindle carrier adjacent the tool head face having the guide-way therein, a guiding tongue projecting from the spindle carrier into the guide-way, a quill carried by the spindle carrier, a spindle journalled in the quill for rotation relative thereto and having its upper end connected with the prime mover, means for adjusting the quill relative to the spindle carrier and, therefore, the spindle toward and from the work supporting table, and means carried by the tool head behind the guide-way therein, and in line with the spindle for effecting the movement of the spindle carrier and parts carried thereby toward and from the work supporting table.

5. In a machine tool organization, the combination of a column or bed, a prime mover at one end thereof, a work support carried by the column or bed at a point below the prime mover, a tool head secured to the column or bed at a point intermediate the prime mover and work support, said tool head having formed in one face thereof an angular shaped guide-way, a spindle carrier adjacent the tool head face having the guide-way therein, a guiding tongue projecting from the spindle carrier into the guide-way, a quill carried by the spindle carrier, a spindle journalled in the quill for rotation relative thereto and having its upper end connected with the prime mover, means for adjusting the quill relative to the spindle carrier and, therefore, the spindle toward and from the work supporting table, means carried by the tool head behind the guide-way therein, and in line with the spindle for effecting the movement of the spindle carrier and parts carried thereby toward and from the work supporting table, including a rod mounted in said head for axial movement relative thereto and connected with the spindle carrier, and an hydraulically actuated piston on said rod for actuating same.

6. In a machine tool organization, the combination of a column or bed, a prime mover at one end thereof, a work support carried by the column or bed at a point below the prime mover, a tool head secured to the column or bed at a point intermediate the prime mover and work support, said tool head having formed in one face thereof an angular shaped guide-way, a spindle carrier adjacent the tool head face having the guide-way therein, a guiding tongue projecting from the spindle carrier into the guide-way, a quill carried by the spindle carrier, a spindle journalled in the quill for rotation relative thereto and having its upper end connected with the prime mover, means for adjusting the quill relative to the spindle carrier and, therefore, the spindle toward and from the work supporting table, means carried by the tool head behind the guide-way therein, and in line with the spindle for effecting the movement of the spindle carrier and parts carried thereby toward and from the work supporting table, including a rod journalled for axial movement in the tool head and connected with the spindle carrier, and manually operable means for actuating the rod.

GEORGE K. McKEE.
CHARLES E. BERNITT.